United States Patent
Sasaki (10) Patent No.: US 7,678,839 B2
(45) Date of Patent: Mar. 16, 2010

(54) EXPANDED POLYPROPYLENE RESIN BEADS, METHOD OF PRODUCING FOAM MOLDING OF EXPANDED POLYPROPYLENE RESIN BEADS AND FOAM MOLDING OBTAINED BY THE METHOD

(75) Inventor: Hidehiro Sasaki, Yokkaichi (JP)

(73) Assignee: JSP Corporation (JP)

( * ) Notice: Subject to any disclaimer, the term of this patent is extended or adjusted under 35 U.S.C. 154(b) by 1019 days.

(21) Appl. No.: 11/387,787

(22) Filed: Mar. 24, 2006

(65) Prior Publication Data

US 2006/0223897 A1   Oct. 5, 2006

(30) Foreign Application Priority Data

Mar. 29, 2005   (JP) .............................. 2005-095066

(51) Int. Cl.
C08J 9/00 (2006.01)
C08J 9/16 (2006.01)
(52) U.S. Cl. .......................................... 521/56; 521/50
(58) Field of Classification Search ............... 521/56, 521/50

See application file for complete search history.

(56) References Cited

U.S. PATENT DOCUMENTS

2002/0182399 A1 * 12/2002 Tokoro et al. ............ 428/313.5

FOREIGN PATENT DOCUMENTS

JP   2002-248645   3/2002

* cited by examiner

Primary Examiner—Mark Eashoo
Assistant Examiner—Angela C Scott
(74) Attorney, Agent, or Firm—Bacon & Thomas, PLLC (57) ABSTRACT

Expanded beads including cell walls which define a plurality of cells and which comprise a base resin containing a polypropylene resin, each of the beads having a through hole extending therein from one end to the other end. The expanded beads have a maximum diameter $D_0$ (mm), an average cell diameter $L_{CV}$ in a radial direction, an average cell diameter $L_{CH}$ in a circumferential direction and a maximum through hole diameter $H_D$ (mm) satisfying the following conditions: $L_{CV}/L_{CH}$ is at least 1.05, $H_D/D_0$ is 0.08 to 0.4 and the ratio $H_D/L_{CV}$ is 0.1 to 10, where $D_0$, $L_{CV}$ and $L_{CH}$ are as defined in the specification. The expanded beads may give a foam molding by an in-mold molding method.

12 Claims, 3 Drawing Sheets

EXPANDED POLYPROPYLENE RESIN BEADS, METHOD OF PRODUCING FOAM MOLDING OF EXPANDED POLYPROPYLENE RESIN BEADS AND FOAM MOLDING OBTAINED BY THE METHOD

CROSS-REFERENCE TO RELATED APPLICATION

This application claims, under 35 USC 119, priority of Japanese Patent Application No. 2005-95066, filed Mar. 29, 2005, disclosure of which, inclusive of the specification, claims and drawings, are hereby incorporated by reference herein.

BACKGROUND OF THE INVENTION

1. Field of the Invention

This invention relates to expanded polypropylene resin beads, to a method of producing a foam molding of expanded polypropylene resin beads and to a foam molding obtained by the method.

2. Description of the Prior Art

Expanded polypropylene resin beads are generally obtained by a dispersion method which includes dispersing particles (or pellets) of a polypropylene resin in water in an autoclave and impregnating the polypropylene resin particles with a blowing agent at a temperature higher than the softening point of the resin under pressurized conditions. The dispersion is then discharged from the autoclave to the atmosphere so that the resin particles are foamed and expanded. In an alternative method, a polypropylene resin is melted and kneaded in an extruder together with a blowing agent and the melt is extruded through a die into a lower pressure atmosphere so that the extrudate is foamed and expanded. The extrudate is cut into particles before or after the completion of the foaming and expansion thereof. A foam molding of expanded polypropylene resin beads may be produced by in-mold molding method in which the expanded beads are filled in a mold cavity defined by male and female molds or fed to a tunnel-like passage defined between a pair of running belts and serving as a mold cavity. A heating medium is then introduced into the mold cavity to expand (secondary expansion) and fuse-bond the expanded beads together. As the heating medium, steam is preferably used because of its easiness in handling and its high specific heat. The resulting foam molding is taken out of the mold cavity after it has been cooled down to such a temperature that it no longer expands when taken out of the mold cavity.

Such a foam molding is now utilized in various fields as an energy absorbing material, a heat insulating material, a cushioning material, a light weight container box because of its excellent physical properties. In these applications, the foam molding is also desired to have a good appearance, a smooth surface and a common degree of air or water permeation resistance. Excellent water permeation resistance is attained by fusion bonding of expanded beads without gaps or interstices. Excellency in water permeation resistance, however, causes a problem that a long time is required to cool down the foam molding in the mold cavity and, hence, the productivity is adversely affected. Namely, during the molding step, as the expanded beads are secondarily expanded and fuse-bonded to each other, the gaps therebetween are narrowed. In order to completely fuse-bond the expanded beads without gaps, it is necessary to use a large amount of steam. Therefore, after the molding step, it is necessary to cool the foam molding for a long period of time. This is disadvantageous from the standpoint of productivity.

To cope with this problem, Japanese Unexamined Patent Publication No. JP-A-2002-248645 proposes a method of producing a foam molding having a water permeation coefficient of 0 cm/sec while shortening a cooling time for the foam molding, which method includes preheating expanded thermoplastic resin small pieces having a through hole to increase the inside pressure thereof to 1.3 to 7 $kgf/cm^2$, and then molding the pretreated small pieces in a mold by heating with steam.

The method of the Japanese publication has a problem because a pretreatment for increasing the inside pressure of the expanded small pieces must be carried out before the molding step at the sacrifice of productivity. The treatment is performed by placing the expanded small pieces in a pressurizing tank. After introducing a pressurized gas such as air or carbon dioxide into the tank, the expanded small pieces are allowed to stand under a pressurized state for several hours to several tens hours and, if necessary, with heating. Such a pretreatment with a pressurized gas is hereinafter referred to simply as "inside pressure increasing pretreatment". Without such an inside pressure increasing pretreatment in the method of the Japanese publication, it is not possible to obtain a foam molding having the desired water permeation resistance, unless the expanded beads are filled in the mold cavity in a very excess amount under a compressed state, i.e. at a high compression ratio, as described in the Japanese publication. When a high compression ratio is adopted, however, the foam molding obtained has a considerably reduced expansion ratio (i.e. an increased density) and, further, the effect of shortening the cooling time is not fully satisfactory. Without such a pretreatment, it would be also possible to obtain a foam molding having the desired water permeation resistance, if the molding is performed using high temperature steam. In this case, however, the foam molding obtained causes considerable shrinkage and is not suited for practical use.

SUMMARY OF THE INVENTION

It is, therefore, the prime object of the present invention to provide expanded beads of a polypropylene resin which do not require a long cooling time when molded with steam and which can give a foam molding having a high water permeation resistance without causing a significant reduction of the expansion ratio of the expanded beads even when the expanded beads are molded in a mold without an inside pressure increasing pretreatment.

Another object of the present invention is to provide a method of producing such a foam molding.

It is a further object of the present invention to provide such a foam molding.

In accomplishing the foregoing object, there is provided in accordance with the present invention expanded beads comprising cell walls which define a plurality of cells and which comprise a base resin comprising a polypropylene resin, each of said beads having a through hole extending therein from one end to the other end, said beads having a maximum diameter $D_0$ (mm), an average cell diameter $L_{CV}$ in a radial direction, an average cell diameter $L_{CH}$ in a circumferential direction and a maximum through hole diameter $H_D$ (mm), wherein $D_0$, $L_{CV}$, $L_{CH}$ and $H_D$ are as defined hereinafter, and wherein the ratio $L_{CV}/L_{CH}$ is at least 1.05, the ratio $H_D/D_0$ is 0.08 to 0.4 and the ratio $H_D/L_{CV}$ is 0.1 to 10;

Definition of $D_0$, $L_{CV}$, $L_{CH}$ and $H_D$ the maximum diameter $D_0$, average cell diameter $L_{CV}$, average cell diameter $L_{CH}$ and maximum through hole diameter $H_D$ are measured as follows:

(a) ten beads are arbitrarily sampled;

(b) each sampled bead is cut by a plane perpendicular to a straight line connecting the one end and the other end of the through hole at the center of said straight line to give an annular cross-section having an outer circumference and an inner circumference;

(c) the annular cross-section is displayed or photographed using a microscope;

(d) on the cross-section thus displayed or photographed, a first straight line is drawn such that the first straight line intersects the outer circumference at two intersection points $D_{01}$ and $D_{02}$ and the inner circumference at two intersection points and that the distance between the two intersection points $D_{01}$ and $D_{02}$ is maximum;

(e) the distance $Dn_0$ (mm) between the two intersection points $D_{01}$ and $D_{02}$ is measured;

(f) a second straight line perpendicular to the first straight line is drawn such that the second straight line intersects the outer circumference at two intersection points $d_{01}$ and $d_{02}$ and the inner circumference at two intersection points and that the distance between the two intersection points $d_{01}$ and $d_{02}$ is maximum;

(g) a circle C1 having a radius of $Dn_0/4$ is drawn with its center at the intersection point P1 between the first and second straight lines;

(h) a number $Nn_H$ of intersection points between the circumference of the circle C1 and cell walls appearing on the displayed or photographed cross-section is counted;

(i) two circles C2 and C3 each having a radius of $Dn_0/8$ are drawn with their centers at the two intersection points P2 and P3, respectively, between the first straight line and the circle C1;

(j) numbers of intersection points between the first straight line and cell walls located on the circle C2 and between the first straight line and cell walls located on the circle C3 are counted, and the greater of the two numbers $Nn_V$ is selected;

(k) an average cell diameter $Ln_{CV}$ is calculated by the following formula:

$Ln_{CV} = 0.405 \times (Dn_0/Nn_V)$;

(l) an average cell diameter $Ln_{CH}$ is calculated by the following formula:

$Ln_{CH} = 0.810 \times Dn_0 \times \sin(\pi/Nn_H)$;

(m) maximum diameter $Hn_D$ (mm) which is the greatest distance between two points on the inner circumference defining the through hole in the displayed or photographed cross-section is measured;

(n) the maximum diameter $D_0$ is an arithmetic mean of $Dn_0$ of the ten sampled beads;

(o) the average cell diameter $L_{CV}$ is an arithmetic mean of $Ln_{CV}$ of the ten sampled beads;

(p) the average cell diameter $L_{CH}$ is an arithmetic mean of $Ln_{CH}$ of the ten sampled beads; and (q) the maximum through hole diameter $H_D$ is an arithmetic mean of $Hn_D$ of the ten sampled beads.

Expanded polypropylene resin beads of the present invention which satisfy these conditions can give, without an inside pressure increasing pretreatment, a foam molding having excellent water-permeation resistance and good appearance. Further, it is possible to produce the foam molding without significant reduction of the expansion ratio of the expanded beads. Moreover, the foam molding can be obtained with a high productivity and a reduced cooling time.

It is inferred that the above prominent effects are obtained by the following mechanism. Namely, since the average cell diameter $L_{CV}$ in the radial direction is greater than the average cell diameter $L_{CH}$ in the circumferential direction ($L_{CV}/L_{CH} \geq 1.05$), the cells are elongated in the radial direction and are radially arranged about the through hole. Further, since $H_D/D_0$ is 0.08 to 0.4, the cross-sectional area of the through hole is not great. It is considered that because of the specific cell geometry and arrangement, the expanded beads of the present invention exhibit superior secondary expansion efficiency as compared with the known expanded beads in which the $L_{CV}/L_{CH}$ is below 1.00.

More specifically, when steam is fed to a mold in which expanded beads have been filled, the expanded beads are heated from outside. Steam can penetrate through the outer skin layer of each bead into the inside cells so that the inside of the beads is also heated. When the pressure within the mold cavity is released and is reduced to the atmospheric pressure, the expanded beads are secondarily expanded. In this case, the steam which has penetrated into the cells is considered to serve as a blowing agent together with the air originally present therein and to contribute to the secondary expansion. Therefore, in order to improve the secondary expansion efficiency, it is desirable that steam can penetrate uniformly and quickly into the cells. For this purpose, the expanded beads of the present invention each have a through hole.

Thus, because of the presence of the through hole, steam can pass therethrough at the time of the molding step. Namely, the area of the bead with which steam is brought into contact increases so that the heating efficiency by steam is improved. As a consequence, it is not necessary to excessively heat the expanded beads in order to secondarily expand the beads. Additionally, after the expanded beads have inflated and have been uniformly filled in the mold cavity, they still expand to close the through holes. Thus, because of the presence of the through holes, the volume in the adiabatic expansion is greater as compared with the case in which the beads have no such through holes. Hence, the effect of cooling by adiabatic expansion within the beads is enhanced so that the cooling time can be reduced.

However, mere presence of the through holes in the expanded beads is insufficient for the beads to give a foam molding having excellent water permeation resistance without an inside pressure increasing pretreatment.

In the expanded bead according to the present invention, elongated cells are radially arranged about its through hole with their major axes being oriented radially. It is inferred that for this reason steam can penetrate into the cells in a larger amount in the expanded beads of the present invention. Moreover, the number of the cell walls through which steam must penetrate per unit length in the radial direction is smaller in the case of the present invention than that in the case in which the cells are not elongated in the radial direction. It is also inferred that for this reason steam can penetrate into the insides of the beads more rapidly in the expanded beads of the present invention. Because of the specific cell geometry and arrangement, the expanded beads of the present invention exhibit superior secondary expansion efficiency. Thus, even when the expanded beads are molded as such without an inside pressure increasing pretreatment, it is possible to obtain a foam molding having excellent water-permeation resistance without a significant reduction of the expansion ratio of the expanded beads.

Further, since a greater amount of steam can penetrate into the cells of the expanded beads during the molding step and since the steam in the cells is condensed during the cooling of the foam molding thus produced, the rate at which the foam molding is cooled is accelerated by an increased heat of condensation.

In another aspect, the present invention provides a method of producing a foam molding having a voidage of 0 to 11% by volume, comprising filling the above expanded beads in a mold without a pretreatment with a pressurized gas for increasing the inside pressure of the expanded beads, and heating the expanded beads in the mold with steam to expand and fuse-bond the expanded beads together. The method can produce a foam molding having a reduced voidage, a low density, an excellent water-permeation resistance, an excellent adhesion between beads and a high compressive strength with a high production efficiency in an economical manner.

The present invention also provides a foam molding obtained according to the above method. The foam molding has excellent properties as mentioned above and is suitably used as a cushioning material, a packaging material and a receptacle.

BRIEF DESCRIPTION OF THE DRAWINGS

Other objects, features and advantages of the present invention will become apparent from the detailed description of the preferred embodiments of the invention which follows, when taken in conjunction with the accompanying drawings in which:

FIG. 2(a) to FIG. 2(d) are each a cross-sectional view, similar to FIG. 3, showing examples of the shape of the expanded bead and the shape of a through hole thereof according to the present invention;

DETAILED DESCRIPTION OF THE PREFERRED EMBODIMENT OF THE INVENTION

Figure 1:
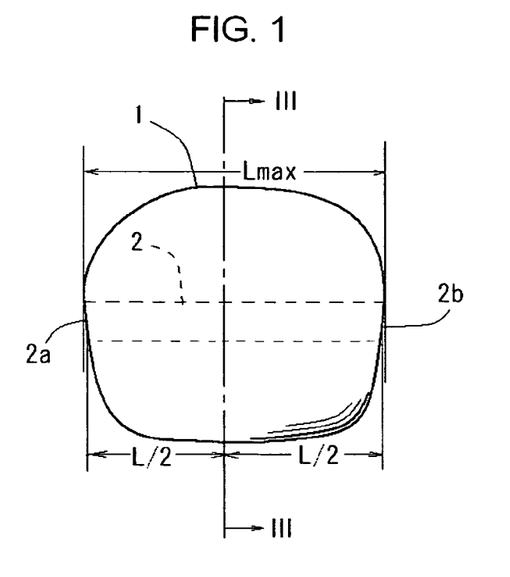
FIG. 1 is a plan view schematically illustrating an expanded bead according to the present invention.
Figure 2A:
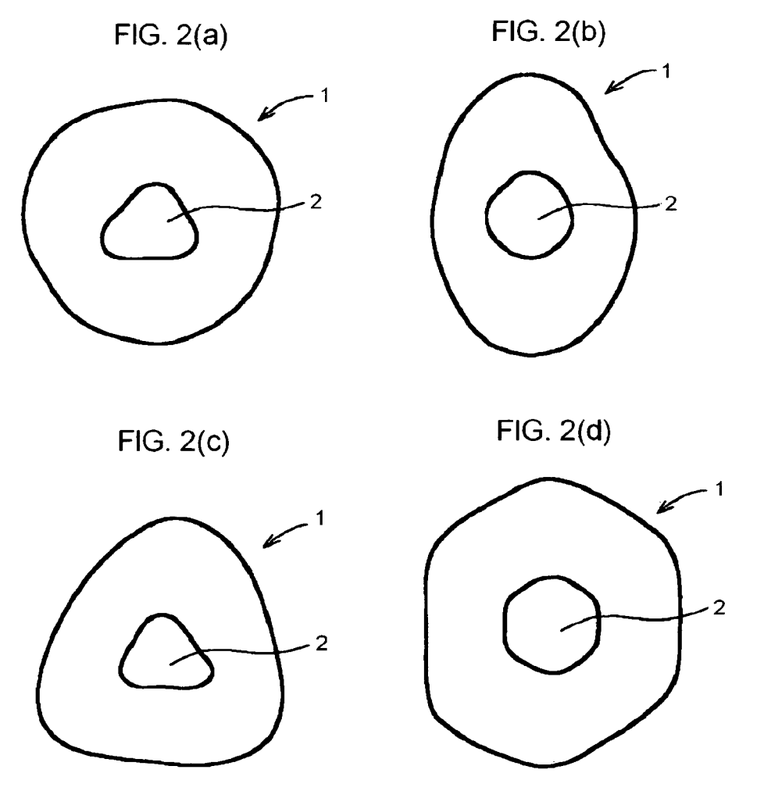

Expanded beads of the present invention comprise cell walls 10 which define a plurality of cells 11 (FIG. 3) and which comprise a base resin comprising a polypropylene resin. As shown in FIG. 1, each of the expanded beads 1 has a through hole 2 extending therein from one end 2a to the other end 2b. The expanded beads are generally round in shape. The term "generally round in shape" as used herein is intended to refer to a broad class of shapes including, for example, spheres, ellipses, circular cylinders, prisms, cubes, cuboids, cones, pyramids, truncated cones and truncated pyramids. Angular corners and ridges of the circular cylinders, prisms, cubes, cuboids, cones, pyramids, truncated cones and truncated pyramids are preferably rounded. Examples of the shape of the expanded bead 1 are illustrated in FIGS. 2(a) to 2(d) which are cross-sectional views taken by a plane perpendicular to the length of the through hole 2. Thus, the expanded bead 1 may be suitably nearly spherical (FIG. 1 and FIG. 2(a)), ellipsoidal (FIG. 2(b)), rounded triangular (FIG. 2(c)), rounded hexagonal (FIG. 2(d)), or any other rounded shape. In the plan view shown in FIG. 1, the bead 1 may also have an external shape shown in FIGS. 2(a) to 2(d). Preferably, the shape of the expanded bead 1 is such that the ratio ($D_0$/Lmax) of the maximum diameter $D_0$ (defined hereinafter) to the maximum length Lmax (the greatest distance of a line between two points on the outer surface of the bead 1 which line is in parallel with a straight line connecting the one end 2a and the other end 2b of the through hole 2; see FIG. 1) is in the range of 0.8 to 1.25, since the gaps or interstices between the expanded beads when filled in a mold cavity can be made small and since the voidage of the foam molding obtained from the expanded beads is small.

The expanded beads have a maximum diameter $D_0$ (mm), an average cell diameter $L_{CV}$ in a radial direction, an average cell diameter $L_{CH}$ in a circumferential direction and a maximum through hole diameter $H_D$ (mm).

The maximum diameter $D_0$, average cell diameter $L_{CV}$, average cell diameter $L_{CH}$ and maximum through hole diameter $H_D$ are measured as follows:

(a) Ten beads are arbitrarily sampled.

(b) Each of the sampled beads is cut by a plane perpendicular to a straight line connecting the one end 2a and the other end 2b of the through hole 2 at the center of the straight line having a length of L (see FIG. 1) to give an annular cross-section having an outer circumference B1 and an inner circumference B2 which defines the through hole 2.

(c) The annular cross-section is displayed or photographed using a microscope.

(d) On the cross-section thus displayed or photographed (see FIG. 3), a first straight line E1 is drawn such that the first straight line E1 intersects the outer circumference B1 at two intersection points $D_{01}$ and $D_{02}$ and the inner circumference B2 at two intersection points $F_{01}$ and $F_{02}$ and that the distance between the two intersection points $D_{01}$ and $D_{02}$ on the outer circumference B1 is maximum. In this case, when there are two or more such straight lines having the maximum distance between two intersection points on the outer circumference B1, the line which has the maximum distance between the two intersection points $F_{01}$ and $F_{02}$ on the inner circumference B2 is selected as the first line E1. When two or more such straight lines having the maximum distance between two intersection points on the inner circumference B2 are still present, then any one of such straight lines may be arbitrarily selected as the first line E1.

(e) The distance $Dn_0$ (mm) between the two intersection points $D_{01}$ and $D_{02}$ is measured.

(f) A second straight line E2 perpendicular to the first straight line E1 is drawn such that the second straight line E2 intersects the outer circumference B1 at two intersection points $d_{01}$ and $d_{02}$ and the inner circumference B2 at two intersection points $f_{01}$ and $f_{02}$ and that the distance between the two intersection points $d_{01}$ and $d_{02}$ on the outer circumference B1 is maximum. In this case, when there are two or more such straight lines having the maximum distance between the two intersection points on the outer circumference B1, the line which has a maximum distance between two intersection points $f_{01}$ and $f_{02}$ on the inner circumference B2 is selected as the second line E2. When two or more such straight lines having the maximum distance between the two intersection points on the inner circumference B2 are still present, then any one of such straight lines may be arbitrarily selected as the second line E2.

(g) A circle C1 having a radius of $Dn_0/4$ is drawn with its center at the intersection point P1 between the first and second straight lines E1 and E2, (h) A number $Nn_H$ of intersection points (shown by the solid circles in FIG. 3) between the circumference of the circle C1 and cell walls appearing on the displayed or photographed cross-section is counted.

Figure 3:
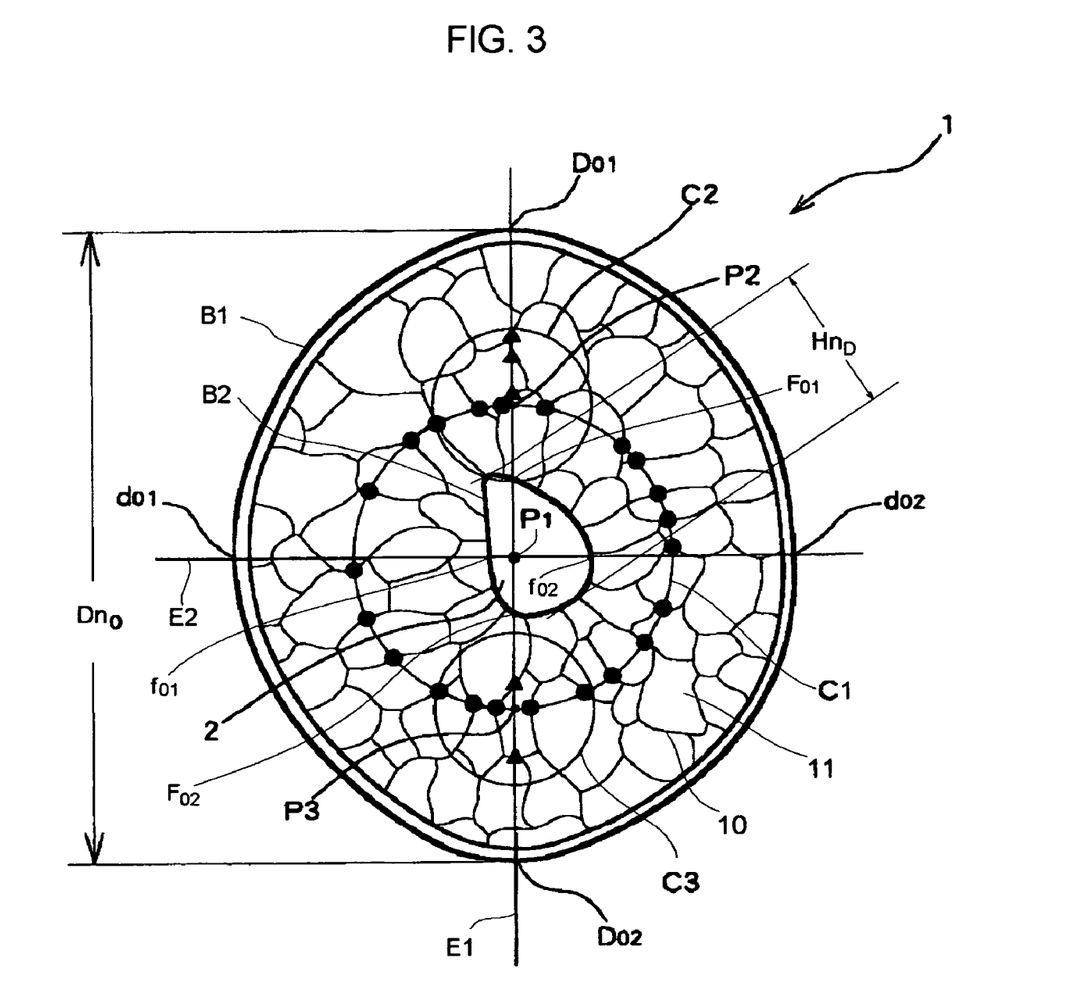
FIG. 3 is an enlarged sectional view taken on line III-III in FIG. 1 and explanatory of a method of determining the maximum diameter $D_0$, average cell diameter $L_{CV}$, average cell diameter $L_{CH}$ and maximum through hole diameter $H_D$ of the expanded bead.

(i) Two circles C2 and C3 each having a radius of $Dn_0/8$ are drawn with their centers at the two intersection points P2 and P3, respectively, between the first straight line E1 and the circle C1, (j) A number of intersection points (shown by the solid trigonals in FIG. 3) between the first straight line and cell walls located on the circle C2 is counted. Similarly a number of intersection points between the first straight line and cell walls located on the circle C3 is counted. The two numbers are compared with each other and the greater of the two numbers $Nn_V$ is selected. In the case of FIG. 3, for example, the two numbers are 2 and 3 and, therefore, the greater number 3 is used as $Nn_V$.

(k) An average cell diameter $Ln_{CV}$ is calculated by the following formula (1):

$$Ln_{CV} = 0.405 \times (Dn_0/Nn_V) \quad (1)$$

(l) An average cell diameter $Ln_{CH}$ is calculated by the following formula (2):

$$Ln_{CH} = 0.810 \times Dn_0 \times \sin(\pi/Nn_H) \quad (2)$$

(m) A maximum diameter $Hn_D$ (mm) which is the greatest distance between two points on the inner circumference B2 defining the through hole 2 in the displayed or photographed cross-section is measured.

(n) The maximum diameter $D_0$ is an arithmetic mean of $Dn_0$ of the ten sampled beads.

(o) The average cell diameter $L_{CV}$ is an arithmetic mean of $Ln_{CV}$ of the ten sampled beads.

(p) The average cell diameter $L_{CH}$ is an arithmetic mean of $Ln_{CH}$ of the ten sampled beads.

(q) The maximum through hole diameter $H_D$ is an arithmetic mean of $Hn_D$ of the ten sampled beads.

The formula (1) is derived as follows. In general, there is the following relationship between the number N of cells located on a line having a length $L_0$ and the average cell diameter Ld:

$$Ld = 1.62 \times (L_0/N) \quad (3)$$

Therefore, by simply substituting $Ln_{CV}$, $Dn_0/4$ and $Nn_V$ for Ld, $L_0$ and N of formula (3), respectively, the formula (1) is derived.

The formula (2) is derived as follows. The perimeter Lp of a regular $N_H$-sided polygon inscribed in a circle having a radius of $Dn_0/4$ is given by:

$$Lp = 2N_H \times (Dn_0/4) \times \sin(2\pi/2N_H)$$

The perimeter of the $Nn_H$-sided polygon inscribed in the circle C1 shown in FIG. 3 can be approximated to that of the regular $Nn_H$-sided polygon. Thus, by simply substituting $Ln_{CH}$, Lp and $Nn_H$ for Ld, $L_0$ and N of formula (3), respectively, the formula (2) is derived.

It is important that the $L_{CV}/L_{CH}$ ratio should be at least 1.05, that the $H_D/D_0$ ratio should be 0.08 to 0.4 and that the $H_D/L_{CV}$ ratio should be 0.1 to 10. Expanded polypropylene resin beads which satisfy these conditions can give, without an inside pressure increasing pretreatment, a foam molding having excellent water-permeation resistance and good appearance. Further, it is possible to produce the foam molding without reducing the expansion ratio of the expanded beads. Moreover, the foam molding can be obtained with a high productivity and a reduced cooling time.

When the ratio $L_{CV}/L_{CH}$ of the average cell diameter in the radial direction to the average cell diameter in the circumferential direction is less than 1.05, the secondary expansion efficiency of the beads is insufficient unless the beads are previously subjected to an inside pressure increasing pretreatment. The $L_{CV}/L_{CH}$ ratio is preferably at least 1.07, more preferably at least 1.10. When the $L_{CV}/L_{CH}$ ratio is excessively high, though the foam molding obtained tends to cause buckling, the heating efficiency by steam is high. The $L_{CV}/L_{CH}$ ratio is preferably 3 or less.

The average cell diameter $L_{CV}$ in the radial direction is preferably at least 30 µm, more preferably at least 50 µm, still more preferably at least 100 µm, most preferably at least 130 µm, since a satisfactory penetration speed of steam into the inside of the bead is obtained and a high dosed cell content is ensured. The average cell diameter $L_{CV}$ is preferably 1,000 µm or less, more preferably 700 µm or less, since such cells have a cell wall thickness suitable for secondary expansion. The average cell diameter $L_{CH}$ in the circumferential direction is preferably at least 28 µm, more preferably at least 47 µm, still more preferably at least 95 µm, since a high closed cell content is ensured. The average cell diameter $L_{CH}$ is preferably 950 µm or less, more preferably 600 µm or less, since such cells have a cell wall thickness suitable for secondary expansion. The number of cells of the expanded bead located on the first line E1 of the cross-section displayed or photographed as shown in FIG. 3 is preferably 5 to 40, more preferably 6 to 30, since the effects of the present invention are easily obtainable.

When the ratio $H_D/D_0$ of the maximum through hole diameter to the maximum diameter is less than 0.08, the through hole is too small in size to obtain the desired cooling effect by adiabatic expansion or desired improvement of the heating efficiency by steam. When the $H_D/D_0$ ratio is greater than 0.4, the through hole is too large to obtain a foam molding having satisfactory water-permeation resistance. The $H_D/D_0$ ratio is preferably 0.1 to 0.25.

When the ratio $H_D/L_{CV}$ of the maximum through hole diameter to the average cell diameter in the radial direction is less than 0.1, the foam molding obtained tends to cause buckling and, further, it is difficult to obtain the desired cooling effect by adiabatic expansion and the desired improvement of the heating efficiency by steam. Too high a $H_D/L_{CV}$ ratio in excess of 10 causes a difficulty in obtaining a foam molding having the desired water-permeation resistance. The $H_D/L_{CV}$ ratio is preferably 0.5 to 8, more preferably 1.2 to 5.5.

The maximum through hole diameter $H_D$ is preferably at least 0.16 mm, more preferably at least 0.2 mm, since the cooling effect by adiabatic expansion and the improvement of the heating efficiency by steam are enhanced. The maximum through hole diameter $H_D$ is preferably 1.8 mm or less, preferably 1.6 mm or less, more preferably 1.2 mm or less, still more preferably 0.9 mm or less, since the expanded beads can be uniformly filled in a mold cavity and since the heating efficiency and shortening of cooling time can be enhanced.

It is preferred that the size and shape of the through hole 2 be such that the inner circumference B2 defining the through hole 2 in the displayed or photographed cross-section of the bead 1 is located within the circle C1. It is also preferred that the size and shape of the through hole 2 be such that the inner circumference B2 defining the through hole 2 is not overlapped by each of the circles C2 and C3. However, a small degree of overlapping is permissive. Thus, it is preferred that the arc length of each of the circles 2 and 3 overlapped by the inner circumference B2 is not more than 30% of the circumference of each of the circles C2 and C3.

With the expanded beads according to the present invention, it is possible to produce a foam molding having a high expansion ratio (low density), because it is not necessary to fill the expanded beads in a mold cavity at a high compression ratio. Thus, even when the apparent density Dt of the expanded beads is less than 36 g/L, a foam molding having a high expansion ratio can be obtained. For reasons of obtaining a foam molding having a high expansion ratio, it is preferred that the expanded beads have an apparent density of 20 to 35 g/L, more preferably 23 to 34 g/L.

As used herein the apparent density Dt of expanded beads is as measured by the following method. Expanded beads are allowed to stand in an isothermal chamber at 23° C. and a relative humidity of 50% under ambient pressure for 10 days. The resulting expanded beads (at least 500 beads) are sampled and immediately weighed ($W_1$ g) in the isothermal chamber and then immediately immersed in ethanol at 23° C. contained in a graduation cylinder. From the rise of the methanol level in the graduation cylinder, the apparent volume ($V_1/cm^3$) of the sampled beads are determined. The apparent density Dt (g/L) is calculated as follows:

$$Dt(g/L)=1000 \times W_1/V_1$$

The base resin from which the expanded beads of the present invention are made includes a polypropylene resin. The term "polypropylene resin" as used herein refers to (1) polypropylene homopolymer, (2) a copolymer of propylene and one or more comonomers having a propylene content of at least 60 mole %, (3) a mixture of two or more of the copolymers (2), or a mixture of the homopolymer (1) and the copolymer (2). The propylene copolymer may be a block copolymer or a random copolymer. Examples of the comonomer include ethylene, 1-butene, 1-pentene, 1-hexene and α-olefins other than propylene.

The block copolymer may be a diblock copolymer such as propylene-ethylene block copolymer or propylene-butene block copolymer, or a triblock copolymer such as propylene-ethylene-butene terpolymer. The random copolymer may be a two-component random copolymer such as propylene-ethylene random copolymer or propylene-butene random copolymer or a three-component random copolymer such as propylene-ethylene-butene random copolymer. The amount of the comonomer other than propylene in the polypropylene resin is preferably 0.05 to 15% by weight, more preferably 0.1 to 10% by weight. The polypropylene resin may be crosslinked or non-crosslinked. For reasons of recyclability, the use of a non-crosslinked polypropylene resin is preferred.

From the standpoint of production efficiency and equipment costs for the production of foam moldings, the polypropylene resin is preferably a random copolymer having a melting point of at most 165° C. or less, more preferably 135° C. to 160° C.

To facilitate obtaining the specific cell geometry and arrangement, it is desired that elongated cells be formed and maintained in the radial directions around the through holes during the expansion and foaming of the polypropylene resin particles (pellets). To achieve this purpose, the base resin of the expanded beads preferably has a melt flow rate (MFR) of 0.1 to 60 g/10 min, more preferably 0.2 to 50 g/10 min, still more preferably 0.5 to 35 g/10 min, particularly preferably 2 to 25 g/10 min. The MFR herein is as measured at a temperature of 230° C. and a load of 2.16 kgf in accordance with the Japanese Industrial Standard JIS K7210-1976, Test Condition 14.

When it is desired to obtain a soft foam molding, an elastomer such as ethylene-propylene rubber may be added to the base resin in an amount of 5 to 40% by weight. As long as the effects and objects of the present invention are not adversely affected, the base resin may contain, in addition to the polypropylene resin, a thermoplastic resin or a thermoplastic elastomer. The amount of such a thermoplastic resin or a thermoplastic resin other than the polypropylene resin is preferably at most 30 parts by weight per 100 parts by weight of the polypropylene resin.

The expanded beads of the present invention preferably show a high temperature peak when measured by DSC. The high temperature peak preferably has a heat of fusion $H_H$ (calorific value) of 2 to 45 J/g, more preferably 5 to 40 J/g. It is preferred that the ratio ($H_H/H_T$) of the heat of fusion $H_H$ of the high temperature peak to a total of the heat of fusion $H_T$ of the expanded beads be 0.05 to 0.5.

Figure 4:
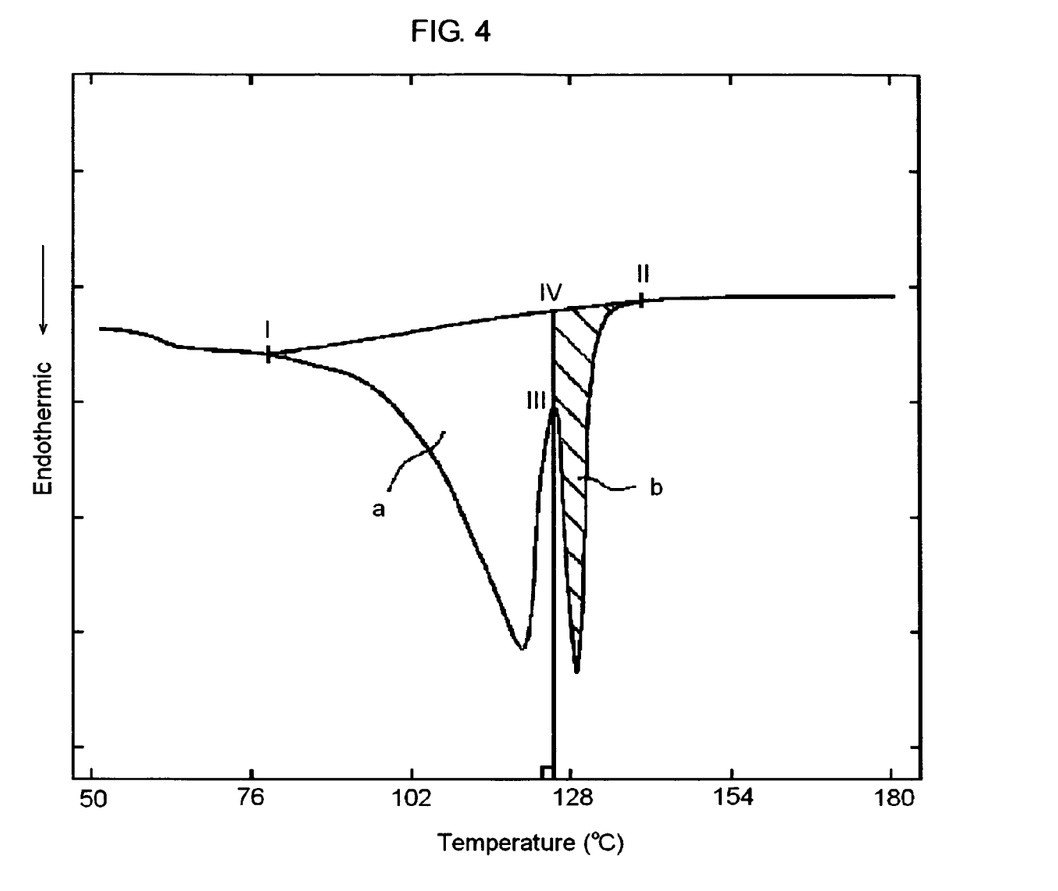
FIG. 4 is an example of a DSC curve of expanded polypropylene resin beads.

The DSC curve herein is as obtained by the differential scanning calorimetric analysis wherein a sample (1 to 8 mg of expanded beads) is heated from room temperature to 220° C. at a rate of 10° C./min. FIG. 4 shows an example of a DSC curve having an intrinsic endothermic peak "a" and a high temperature endothermic peak "b". The area of the peak "b" represents the heat of fusion $H_H$ of the high temperature peak "b" and is determined as follows. As shown in FIG. 4, a first straight line extending between the point I in the curve at 80° C. and the point II in the curve at a melt completion temperature is drawn. Next, a second straight line which is parallel with the ordinate and which passes a point III between the peaks "a" and "b" is drawn. The second straight line crosses the first straight line at an intersection point IV. The area of the high temperature peak "b" is the shaded area defined by the first and second straight lines and the DSC curve extending between the points III and II. The total heat of fusion $H_T$ of the expanded beads is a total of the heat of fusion of the high temperature peak "b" and the heat of fusion of the intrinsic peak "a". Thus, the heat of fusion of the intrinsic peak "a" is the area defined by the first and second straight lines and the DSC curve extending between the points I and III. The method to adjusting the heat of fusion $H_H$ of the high temperature peak is well known as disclosed in for example U.S. Pat. No. 6,838,488 B2, U.S. Pat. No. 6,451,419 B1, U.S. Pat. No. 6,313,184 B1, U.S. Pat. No. 6,077,875, U.S. Pat. No. 6,034,144 and US 2004/0171708 A1.

It is preferred that the base resin be mixed with a cell controlling agent for controlling the cell size of the expanded beads. The cell controlling agent may be, for example, an inorganic powder such as talc, calcium carbonate, borax, zinc borate or aluminum hydroxide and may be used in an amount of 0.001 to 10 parts by weight, more preferably 0.01 to 5 parts by weight, per 100 parts by weight of the base resin, for reasons of easiness in controlling the average cell diameter $L_{CV}$ in the radial direction of the expanded beads to 30 μm or greater. The base resin may further be compounded with a colorant such as a pigment or a dye in a suitable amount. The cell controlling agent and/or colorant may be fed directly to an extruder together with the base resin, but may be preferably previously kneaded with a quantity of the base resin into a master batch to improve the dispersion efficiency. The master batch stock diluted with the base resin is suitably fed to an extruder.

The expanded beads of the present invention preferably have a ratio Dt/Db of the apparent density Dt thereof to the bulk density Db thereof in the range of 1.6 to 2.6, more preferably 1.6 to 2.1, still more preferably 1.6 to 1.9, since such expanded beads can permit the production of a foam molding having excellent water-permeation resistance, appearance and mechanical properties while improving the production efficiency due to capability of shortening the cooling time.

As used herein the bulk density Db of expanded beads is as measured by the following method. Expanded beads are allowed to stand in an isothermal chamber at 23° C. and a relative humidity of 50% under ambient pressure for 10 days.

The resulting expanded beads (at least 500 beads) are sampled and immediately weighed ($W_2$ g) in the isothermal chamber and then immediately placed in an empty graduation cylinder to measure the volume ($V_2$ cm$^3$) of the sampled beads. The bulk density Db (g/L) is calculated as follows:

$$Db(g/L)=1000 \times W_2/V_2$$

Description will be next made of a method for preparing the expanded beads of the present invention. The expanded beads may be suitably prepared by a dispersion method in which previously prepared polypropylene resin particles having through holes are dispersed in a dispersing medium, such as water, in an autoclave together and impregnated with a physical blowing agent. The resulting dispersion is discharged from the autoclave into a lower pressure atmosphere to obtain the expanded beads. Alternatively, the expanded beads may be prepared by an extrusion method in which a base resin including a polypropylene resin is melted and kneaded in an extruder together with a blowing agent to form a molten expandable resin composition, the molten composition being extruded through a die in the form of a tubular strand into a lower pressure atmosphere so that the tubular strand is foamed and expanded. After or during the expansion, the tubular strand is cut to obtain expanded beads each having a through hole. The extrusion method described in European patent No. 588321 or No. 968077 may be suitable used for the purpose of the present invention, if the die used is configured to form a tubular strand.

In either of the dispersion method and the extrusion method, it is desired that the pressure difference between the pressurized state (before discharging from autoclave or extruder) in which expansion and foaming have not yet started and the pressure-released state (after discharging from the autoclave or extruder) in which expansion and foaming occur be at least 400 kPa, more preferably 500 to 15,000 kPa. Additionally, the maximum diameter $D_0$, average cell diameter $L_{CH}$ in the circumferential direction, average cell diameter $L_{CV}$ in the radial direction and maximum through hole diameter $H_D$ controlled so as to control the $L_{CV}/L_{CH}$ ratio, $H_D/L_{CV}$ ratio and the $H_D/D_0$ within the above specified ranges.

In general, the following factors have an influence upon $H_D$, $D_0$ and $L_{CV}$. The greater the expansion ratio of the expanded beads is, the greater is $H_D$. The greater the through hole of the resin particles used in the dispersion method is, the greater is $H_D$. The greater the diameter of an inner wall defining an annular slit used in the extrusion method is, the greater is $H_D$. The greater the expansion ratio of the expanded beads is, the greater is $D_0$. The greater the thickness of walls of the resin particles defining through holes is, the greater is $D_0$. The average cell diameter of the expanded beads have a great influence upon $L_{CV}$. The average cell diameter of the expanded beads may be controlled by the kind and amount of the blowing agent, expansion temperature and the kind and amount of the cell controlling agent. The expansion ratio can be controlled by the amount of the blowing agent, expansion temperature and the afore-mentioned pressure difference. Generally, the larger the amount of the blowing agent, the higher the expansion temperature and the greater the pressure difference, the greater is the expansion ratio of the expanded beads. The diameter of the through holes of the resin particles from which the expanded beads are produced by the dispersion method has a significant influence upon the $L_{CV}/L_{CH}$ ratio.

The resin particles having through holes may be prepared as follows. In an extruder, the base resin is heated and kneaded together with a cell controlling agent. The kneaded mass is then extruded through a die in the form of tubular strands. The strands are cooled by immersion into water and cut into suitable lengths to obtain the resin particles each having a through hole.

The tubular strands may be obtained by using a die having annular slits each having nearly the same dimension as that of the cross-section of the tubular strand. To prevent deformation of the holes of the strands before being cooled, the inside pressure of the holes is preferably maintained at atmospheric pressure or a higher pressure. To achieve this purpose, an air feed port may be provided in the center of each of the inner walls defining the annular slits. By communicating the air feed ports with the ambient atmospheric pressure or with a source of a pressurized air, the inside pressure of the holes can be maintained at atmospheric pressure or a higher pressure.

It is preferred that the resin particles have a weight per particle of 0.02 to 20 mg, more preferably 0.1 to 6 mg, since the resin particles and the expanded beads obtained therefrom can retain their through holes without closure and since the expanded beads obtained therefrom can be uniformly filled in a mold cavity for the production of a foam molding.

It is also preferred that the through holes of the resin particles have a diameter of 0.05 to 0.24 mm, more preferably 0.05 to 0.23 mm, still more preferably 0.06 to 0.20 mm, since the expanded beads have substantially no blocked through holes and since a foam molding obtained from the expanded beads shows satisfactory water-penetration resistance. As used herein, the diameter of the resin particles is a maximum through hole diameter measured in the same manner as that for the above-described maximum through hole diameter $H_D$.

The melt flow rate (MFR) of the base resin does not significantly change during the course of the preparation of the resin particles and the preparation of the expanded beads therefrom. Thus, the melt flow rate of the base resin for the preparation of the resin particles is suitably as specified above with regard to the expanded beads.

The expanded beads are prepared from thus prepared resin particles by the dispersion method in which the resin particles are dispersed in a dispersing medium, such as water, in an autoclave together with a physical blowing agent and heated under a pressure to a temperature higher than the softening point of the resin particles to impregnate the resin particles with the blowing agent. The resulting dispersion is discharged from a bottom portion of the autoclave into a lower pressure atmosphere while maintaining the pressure within the autoclave at a pressure higher than the vapor pressure of the blowing agent, so that the resin particles are foamed and expanded to obtain the expanded beads. Because of the surface tension of the dispersing medium acted on the softened resin particles during the impregnation thereof with the blowing agent, the resin particles are smoothed and rounded. Therefore, the expanded beads obtained from such rounded resin particles are generally round in shape. The diameter of the through holes of the resin particles generally increases as a result of the expansion and foaming. Thus, the expanded beads generally have a greater diameter than their raw material resin particles.

Further, it is preferred that the discharge of the dispersion from the autoclave into a lower atmospheric pressure be performed while maintaining the pressure inside the autoclave at least 0.5 MPa(G), more preferably at least 1.5 MPa(G), since the specific cell geometry and arrangement may be obtained in a facilitated manner.

The blowing agent used in the dispersion method may be an organic physical blowing agent such as an aliphatic hydrocarbon, e.g. propane, butane, isobutane, pentane, isopentane or hexane, an alicyclic hydrocarbon, e.g. cyclobutane, cyclopentane or cyclohexane or a halogenated hydrocarbon, e.g. chlorofluoromethane, trifluoroethane, 1,1,1,2-tetrafluoroethane, 1-chloro-1,1-difluoroethane, 1,1-difluoroethane or 1-chloro-1,2,2,2-tetrafluoroethane, or an inorganic physical blowing agent such as nitrogen, carbon dioxide, argon or air. These blowing agents may be used alone or in combination of two or more thereof. From the standpoint of costs and environmental problem, the use of an inorganic blowing agent, particularly nitrogen, air or carbon dioxide is preferred. When expanded beads with a low apparent density (high expansion ratio) are desired, a mixed blowing agent composed of carbon dioxide and butane may be suitably used.

The amount of the blowing agent is suitably determined in consideration of the intended expansion ratio of the expanded beads and the expansion temperature employed. The blowing agent other than nitrogen and air is generally used in an amount of 2 to 50 parts by weight per 100 parts by weight of the resin particles. In the case of nitrogen or air, the blowing agent is used in an amount so that the pressure inside the autoclave is within the range of 10 to 70 kgf/cm$^2$G.

Any liquid in which the resin particles are insoluble may be used as the dispersing medium. Examples of the dispersing medium include water, ethylene glycol, glycerin, methanol, ethanol and mixtures thereof. The dispersing medium is preferably water or an aqueous dispersing medium.

An adhesion preventing agent which is substantially insoluble in the dispersing medium and which is not melted at the expansion temperature may be added to the dispersion medium to prevent the adhesion between the resin particles during the heating of the resin particles in the dispersing medium. A fine organic or inorganic powder, particularly an inorganic powder, having an average particle diameter of 0.001 to 100 μm, preferably 0.001 to 30 μm, may be used. Examples of the adhesion preventing agent include kaolin, talc, mica, aluminum oxide, titanium oxide and aluminum hydroxide. The amount of the adhesion preventing agent is 0.01 to 10 parts by weight per 100 parts by weight of the resin particles.

A dispersing aid such as aluminum sulfate and/or an anionic surfactant, e.g. sodium dodecylbenzenesulfonate or sodium oleate, may be added to the dispersion medium in an amount of 0.001 to 5 parts by weight per 100 parts by weight of the resin particles, if desired.

A method of producing a foam molding according to the present invention comprises filling the above expanded beads in a mold and heating the expanded beads in the mold with steam to expand and fuse-bond the expanded beads together. The molding conditions such as heating temperature and time in the mold are suitably determined with the consideration of the shape of the expanded beads, expandability of the expanded beads and tendency to shrink of the foam molding produced. Because the expanded beads have excellent secondary expansion efficiency, it is not necessary to pretreat the expanded beads with a high pressure gas to increase the inside pressure of the cells thereof.

The expanded beads are preferably filled in a mold cavity with a compression ratio of 4 to 25%, more preferably 5 to 20%, since a foam molding having the desired appearance, mechanical strengths, water-permeation and density may be easily obtained. If the compression ratio is less than 4%, it will be necessary to pretreat the expanded beads for increasing the inside pressure thereof. Excessively high compression ratio does not give any advantage but rather results in a foam molding having a density greater than the bulk density of the expanded beads.

The compression ratio can be controlled by charging the expanded beads in the mold cavity, within which the expanded beads are to be molded, in a controlled amount greater than the inside volume of the mold cavity. In the in-mold molding method, it is the general practice not to fully close the male and female molds but to maintain the molds slightly open until full heating is carried out. Such an opening of the molds (generally called cracking) is suitably used to efficiently fill the expanded beads in the mold cavity and to discharge air in the mold cavity therethrough by purging steam. Just before the full heating with steam of the expanded beads to expand and fuse the expanded beads together is carried out, the molds are fully closed and, therefore, the expanded beads are compressed. By adjusting the degree of cracking (opening) of the molds, therefore, the compression ratio may be controlled.

As used herein, the compression ratio (%) is determined by the weight ($W_{beads}$ (g)) of the expanded beads charged in a mold cavity having a volume ($V_{mold}$ (L)) and the bulk density (Db (g/L)) of the expanded beads according to the following formula:

$$\text{Compression ratio (\%)} = [W_{beads}/Db - V_{mold})/V_{mold}] \times 100$$

After the expanded beads in the mold have been fuse-bonded together, the resulting molding is cooled with water. The cooling may be also carried out by a vacuum method in which the mold is evacuated to cool the molding by utilization of heat of vaporization of steam.

The foam molding preferably has a voidage of 0 to 11 volume %. A foam molding having a voidage of more than 11 volume % fails to have satisfactory appearance and mechanical strengths such as compressive strength and fusion-bonding strength because of insufficient fusion bonding between the beads, and, therefore, cannot be suitably used as cushioning materials, packing materials and containers.

As used herein the voidage is calculated by the following formula:

$$\text{Voidage (\%)} = [(B-C)/B] \times 100$$

in which B is a volume (cm$^3$) of the foam molding measured from the dimensions thereof and C is a volume (cm$^3$) measured from a rise of the liquid level when a sample specimen of the foam molding is immersed in the liquid (such as alcohol) contained in a graduation cylinder.

The foam molding preferably has a water permeation rate of 0 cm/sec, since otherwise the desired compressive strength and fusion-bonding strength are not obtainable. Further, the water permeation rate of 0 cm/sec is essential when the foam molding is used as a container such as a fish transporting box.

As used herein the water permeation rate is as measured by a constant head permeability test according to JIS A1218 using a foam molding having a length of 120 mm, a width of 120 mm and a thickness of 50 mm as a specimen and a rectangular vessel for containing the specimen.

Such a foam molding having a voidage of 0 to 11 volume % and a water permeation rate of 0 cm/sec can be suitably obtained by the above-described method according to the present invention.

The following examples will further illustrate the present invention.

The polypropylene resins used in Examples and Comparative Examples are (a) a propylene-ethylene random copolymer (MFR: 7 g/10 min, melting point: 143° C., hereinafter referred to as rPP), (b) a propylene-ethylene block copolymer (MFR: 10 g/10 min, melting point: 160° C., hereinafter referred to as bPP), and (c) a propylene homopolymer (MFR: 10 g/10 min, melting point: 165° C., hereinafter referred to as hPP).

Example 1 to 7 and Comparative Examples 1 to 7

A base resin shown in Table 1 was melted and kneaded together with zinc borate (cell controlling agent), and the kneaded mass was extruded through a die in the form of tubular strands (in the case of Comparative Examples 1 and 2, the kneaded mass was extruded through a die in the form of solid strands). The strands were immediately quenched in water and cut to obtain resin particles having an average weight per one particle of 2 mg. The zinc borate was in the form of a master batch and used in an amount so that the content of the zinc borate in the resin particles was 0.05% by weight (0.01% by weight in the case of Comparative Examples 2, 3 and 6). The ratio of the outer diameter of the resin particle to the length thereof and the diameter of the through hole of the resin particle were as shown in Table 1.

The resin particles were then foamed and expanded. Thus, in an autoclave having an inside volume of 5 L, 3 L of water, 1 kg of the resin particles, 3 g of kaolin (adhesion preventing agent), 0.06 g of sodium dodecylbenzenesulfonic acid (dispersing aid) were charged (in the case of Example 3 and Comparative Examples 2, 3 and 6, 0.01 g of aluminum sulfate (dispersing aid) was additionally charged). After charging the blowing agent gas shown in Table 1 in the autoclave, the contents in the autoclave were heated with stirring to the expansion temperature shown in Table 1 and the resulting dispersion was maintained at that temperature for 15 minutes at the equilibrium vapor pressure shown in Table 1. Thereafter, while introducing the blowing agent gas into the autoclave to apply a back pressure equal to the equilibrium vapor pressure and to keep the dispersion in the autoclave at the equilibrium vapor pressure, the dispersion was discharged from a bottom of the autoclave into the atmosphere, so that the resin particles were foamed and expanded to obtain expanded beads each having a through hole (in the case of Comparative Examples 1 and 2, expanded beads had no through holes). The obtained expanded beads were dried at room temperature and measured for their physical properties, i.e. the maximum length (Lmax) of the beads in the direction parallel with the line connecting the one end and the other end of the through hole, bulk density Db, apparent density Dt, through hole maximum diameter $H_D$, maximum diameter ($D_0$), average cell diameter ($L_{CV}$) in the radial direction, average cell diameter ($L_{CH}$) in the circumferential direction. The results are summarized in Table 2.

Using the expanded beads thus obtained, an in-mold foam molding in the form of a rectangular parallelepiped body having a length of 25 cm, a width of 20 cm and a thickness of 5 cm was prepared under the molding conditions shown in Table 3. No inside pressure increasing pretreatment was carried out. Thus, the expanded beads were filled in a mold cavity and compressed by closing the mold at the compression ratio shown in Table 3. The expanded beads were then heated with steam at the pressure shown in Table 3 and expanded and fuse-bonded together to obtain a foam molding. The maximum pressure (surface pressure) applied to an inside surface of the mold cavity by the expansion of the expanded beads during the molding step was as shown in Table 3. The mold was cooled for the cooling time shown in Table 3 and the foam molding was taken out of the mold. The cooling time is a time required to cool down the foam molding to such a degree that it no longer expands when taken out of the mold. The foam molding was then measured for its density Md, voidage and water permeation rate and evaluated for its appearance and cooling efficiency. Based on the measurement results, overall judgment was also made. The cooling efficiency is evaluated on the basis of the cooling time in consideration of the density of the foam molding, since the cooling time increases with an increase of the density of the foam molding.

TABLE 1

|  | Properties of Resin Particles | | | | Expansion Conditions | | |
| --- | --- | --- | --- | --- | --- | --- | --- |
|  | Base resin | Diameter of through hole (mm) | Average weight per particle (mg) | Aspect ratio | Expansion temperature (° C.) | Blowing agent | Equilibrium vapor pressure (MPaG) |
| Example 1 | rPP | 0.15 | 2 | 2.5 | 149 | $CO_2$ | 2.2 |
| Example 2 | rPP | 0.09 | 2 | 2.5 | 149 | $CO_2$ | 2.4 |
| Example 3 | rPP | 0.14 | 2 | 2.5 | 153 | air | 0.9 |
| Example 4 | rPP | 0.13 | 2 | 2.5 | 149 | $CO_2$ | 3.6 |
| Example 5 | hPP | 0.09 | 2 | 1.5 | 169 | $CO_2$ | 1.8 |
| Example 6 | bPP | 0.09 | 2 | 1.5 | 165 | $CO_2$ | 1.8 |
| Example 7 | rPP | 0.06 | 2 | 2.5 | 149.5 | $CO_2$ | 3.6 |
| Comp. Ex. 1 | rPP | 0 | 2 | 2.5 | 149 | $CO_2$ | 2.5 |
| Comp. Ex. 2 | rPP | 0 | 2 | 2.5 | 153 | air | 0.7 |
| Comp. Ex. 3 | rPP | 0.16 | 2 | 2.5 | 152 | air | 4.5 |
| Comp. Ex. 4 | rPP | 0.16 | 2 | 2.5 | 148 | $CO_2$ | 2.8 |
| Comp. Ex. 5 | rPP | 0.03 | 2 | 2.5 | 148 | $CO_2$ | 3.2 |
| Comp. Ex. 6 | hPP | 0.48 | 2 | 1.5 | 173 | air | 0.9 |
| Comp. Ex. 7 | rPP | 0.25 | 2 | 2.5 | 149 | $CO_2$ | 3.5 |

TABLE 2

|  | Lmax/ $D_0$ | Db (g/L) | Dt (g/L) | $H_D$ (mm) | $D_0$ (mm) | $L_{CV}$ (μm) | $L_{CH}$ (μm) | $H_D$/ $D_0$ | $H_D$/ $L_{CV}$ | $L_{CV}$/ $L_{CH}$ | Dt/ Db |
| --- | --- | --- | --- | --- | --- | --- | --- | --- | --- | --- | --- |
| Example 1 | 1.1 | 50 | 91 | 0.71 | 3.10 | 419 | 315 | 0.23 | 1.69 | 1.33 | 1.84 |
| Example 2 | 1 | 52 | 86 | 0.42 | 3.08 | 416 | 217 | 0.14 | 1.01 | 1.92 | 1.65 |
| Example 3 | 1.1 | 150 | 248 | 0.47 | 2.50 | 144 | 132 | 0.19 | 3.26 | 1.09 | 1.65 |
| Example 4 | 1 | 19 | 32 | 0.84 | 3.73 | 302 | 256 | 0.23 | 2.78 | 1.18 | 1.66 |
| Example 5 | 1.1 | 62 | 101 | 0.40 | 3.05 | 250 | 200 | 0.13 | 1.60 | 1.25 | 1.63 |

TABLE 2-continued

|  | Lmax/ $D_0$ | Db (g/L) | Dt (g/L) | $H_D$ (mm) | $D_0$ (mm) | $L_{CV}$ (μm) | $L_{CH}$ (μm) | $H_D/D_0$ | $H_D/L_{CV}$ | $L_{CV}/L_{CH}$ | Dt/Db |
|---|---|---|---|---|---|---|---|---|---|---|---|
| Example 6 | 1.1 | 70 | 114 | 0.39 | 3.06 | 260 | 193 | 0.13 | 1.50 | 1.35 | 1.63 |
| Example 7 | 1 | 18 | 29 | 0.39 | 3.71 | 321 | 254 | 0.11 | 1.21 | 1.26 | 1.62 |
| Comp. Ex. 1 | 1 | 50 | 80 | 0.00 | 2.71 | 274 | 287 | 0.00 | 0.00 | 0.95 | 1.60 |
| Comp. Ex. 2 | 1 | 165 | 264 | 0.00 | 2.89 | 292 | 305 | 0.00 | 0.00 | 0.96 | 1.60 |
| Comp. Ex. 3 | 1.1 | 25 | 43 | 0.95 | 3.55 | 120 | 119 | 0.27 | 7.92 | 1.01 | 1.72 |
| Comp. Ex. 4 | 1.2 | 53 | 98 | 0.72 | 2.95 | 52 | 47 | 0.24 | 13.85 | 1.11 | 1.84 |
| Comp. Ex. 5 | 1.2 | 54 | 87 | 0.15 | 2.65 | 75 | 74 | 0.06 | 2.00 | 1.01 | 1.61 |
| Comp. Ex. 6 | 1.2 | 85 | 226 | 1.90 | 3.01 | 36 | 37 | 0.63 | 52.78 | 0.97 | 2.66 |
| Comp. Ex. 7 | 1.1 | 18 | 36 | 1.67 | 3.75 | 243 | 252 | 0.45 | 6.87 | 0.96 | 2.00 |

TABLE 3

|  | Molding Conditions | | | | Properties of Foam Molding | | | | Evaluation | | |
|---|---|---|---|---|---|---|---|---|---|---|---|
|  | Compression ratio (%) | Steam pressure (kPaG) | Surface pressure (kPaG) | Cooling time (s) | Density Md (g/L) | Voidage (%) | Water permeation rate (cm/s) | Db/Md | Appearance | Cooling efficiency | Overall |
| Example 1 | 5 | 333 | 157 | 18 | 52 | 3.5 | 0 | 0.95 | good | good | good |
| Example 2 | 5 | 353 | 186 | 31 | 55 | 3.2 | 0 | 0.95 | good | good | good |
| Example 3 | 5 | 353 | 196 | 87 | 158 | 3.6 | 0 | 0.95 | good | good | good |
| Example 4 | 20 | 216 | 157 | 25 | 23 | 3.8 | 0 | 0.84 | good | good | good |
| Example 5 | 10 | 451 | 196 | 25 | 69 | 3.0 | 0 | 0.90 | good | good | good |
| Example 6 | 10 | 451 | 196 | 28 | 78 | 3.4 | 0 | 0.90 | good | good | good |
| Example 7 | 20 | 196 | 157 | 26 | 21 | 3.7 | 0 | 0.84 | good | good | good |
| Comp. Ex. 1 | 5 | 353 | 177 | 40 | 53 | 3.6 | 0 | 0.95 | good | bad | bad |
| Comp. Ex. 2 | 5 | 373 | 206 | 180 | 174 | 3.2 | 0 | 0.95 | good | bad | bad |
| Comp. Ex. 3 | 5 | 353 | 9.8 | 10 | 26 | 14.5 | 1 | 0.95 | bad | good | bad |
| Comp. Ex. 4 | 5 | 353 | 19.6 | 10 | 56 | 15.0 | 1 | 0.95 | bad | good | bad |
| Comp. Ex. 5 | 5 | 353 | 177 | 38 | 57 | 3.5 | 0 | 0.95 | good | bad | bad |
| Comp. Ex. 6 | 10 | 451 | 0 | 10 | 94 | 20.0 | 3 | 0.90 | bad | good | bad |
| Comp. Ex. 7 | 35 | 216 | 196 | 36 | 24 | 3.0 | 0 | 0.76 | good | bad | bad |

From the results shown in Table 3, it is appreciated that a foam molding having a small voidage and an excellent water permeation resistance can be obtained with the expanded beads of the present invention, even when the expanded beads are subjected to in-mold molding without an inside pressure increasing pretreatment. Further, even when the in-mold molding of the expanded beads of the present invention is carried out with a low compression ratio, a foam molding having a small voidage, a good appearance and an excellent water permeation resistance can be obtained with a high cooling efficiency. Since the compression ratio can be made small, the density of the foam molding according to the present invention is not much higher than the bulk density of the expanded beads used. Namely, the expansion ratio of the expanded beads can be reflected upon the density of the foam molding.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all the changes which come within the meaning and range of equivalency of the claims are therefore intended to be embraced therein.

What is claimed is:

1. Expanded beads comprising cell walls which define a plurality of cells and which comprise a base resin comprising a polypropylene resin, each of said beads having a through hole extending therein from one end to the other end, said beads having a maximum diameter $D_0$ mm, an average cell diameter $L_{CV}$ in a radial direction, an average cell diameter $L_{CH}$ in a circumferential direction and a maximum through hole diameter $H_D$ mm, wherein $D_0$, $L_{CV}$, $L_{CH}$ and $H_D$ are as defined hereinafter and measured as described hereinafter, and wherein the ratio $L_{CV}/L_{CH}$ is at least 1.05, the ratio $H_D/D_0$ is 0.08 to 0.4 and the ratio $H_D/L_{CV}$ is 0.1 to 10; and wherein $D_0$, $L_{CV}$, $L_{CH}$ and $H_D$ are measured and defined as follows:

(a) ten beads are arbitrarily sampled;

(b) each sampled bead is cut by a plane perpendicular to a straight line connecting the one end and the other end of the through hole at the center of said straight line to give an annular cross-section having an outer circumference and an inner circumference;

(c) the annular cross-section is displayed or photographed using a microscope;

(d) on the cross-section thus displayed or photographed, a first straight line is drawn such that the first straight line intersects the outer circumference at two intersection points $D_{01}$ and $D_{02}$ and the inner circumference at two intersection points $D_{01}$ and $D_{02}$ is the maximum diameter of the annular cross-section;

(e) the distance $Dn_0$ mm between the two intersection points $D_{01}$ and $D_{02}$ is measured;

(f) a second straight line perpendicular to the first straight line is drawn such that the second straight line intersects the outer circumference at two intersection points $d_{01}$ and $d_{02}$ and the inner circumference at two intersection points and that the distance between the two intersection points $d_{01}$ and $d_{02}$ is maximum;

(g) a circle C1 having a radius of $Dn_0/4$ is drawn with its center at the intersection point P1 between the first and second straight lines;

(h) a number $Nn_H$ of intersection points between the circumference of the circle C1 and cell walls appearing on the displayed or photographed cross-section is counted;

(i) two circles C2 and C3 each having a radius of $Dn_0/8$ are drawn with their centers at the two intersection points P2 and P3, respectively, between the first straight line and the circle C1;

(j) numbers of intersection points between the first straight line and cell walls located on the circle C2 and between the first straight line and cell walls located on the circle C3 are counted, and the greater of the two numbers $Nn_V$ is selected;

(k) an average cell diameter $Ln_{CV}$ is calculated by the following formula:

$$Ln_{CV}=0.405 \times (Dn_0/Nn_V);$$

(l) an average cell diameter $Ln_{CH}$ is calculated by the following formula:

$$Ln_{CH}=0.810 \times Dn_0 \times \sin(\pi/Nn_H);$$

(m) maximum diameter $Hn_D$ mm is the greatest distance between two points on the inner circumference defining the through hole in the displayed or photographed cross-section is measured;

(n) $D_0$ is a maximum diameter calculated as an arithmetic mean of $Dn_0$ of the ten sampled beads;

(o) $L_{CV}$ is an average cell diameter calculated as an arithmetic mean of $Ln_{CV}$ of the ten sampled beads;

(p) $L_{CH}$ is an average cell diameter calculated as an arithmetic mean of $Ln_{CH}$ of the ten sampled beads; and (q) $H_D$ is a maximum through hole diameter calculated as an arithmetic mean of $Hn_D$ of the ten sampled beads.

2. Expanded beads as claimed in claim 1, wherein the expanded beads have an apparent density of less than 36 g/L.

3. Expanded beads as claimed in claim 1, wherein the ratio $L_{CV}/L_{CH}$ is at least 1.07.

4. Expanded beads as claimed in claim 1, wherein the ratio $L_{CV}/L_{CH}$ is 1.1 to 3.

5. Expanded beads as claimed in claim 1, wherein the ratio $H_D/D_0$ is 0.1 to 0.25.

6. Expanded beads as claimed in claim 1, wherein the ratio $H_D/L_{CV}$ is 0.5 to 8.

7. Expanded beads as claimed in claim 1, wherein the ratio $H_D/L_{CV}$ 1.2 to 5.5.

8. Expanded beads as claimed in claim 1, wherein $L_{CV}$ is at least 30 μm, $L_{CH}$ is at least 28 μm and $H_D$ is at least 0.16 mm.

9. Expanded beads as claimed in claim 1, wherein said expanded beads have an apparent density of Dt g/L and a bulk density of Db g/L and wherein the ratio Dt/Db of the apparent density to the bulk density is 1.6 to 2.6.

10. A method of producing a foam molding having a voidage of 0 to 11% by volume, comprising filling expanded beads according to claim 1 in a mold without a pretreatment with a pressurized gas for increasing the inside pressure of the expanded beads, and heating the expanded beads in the mold with steam to expand and fuse-bond the expanded beads together.

11. A method as claimed in claim 10, wherein said expanded beads are filled in said mold with a compression ratio of 4 to 25%.

12. A foam molding obtained according to a method of claim 10.

* * * * *